United States Patent
Kolb

[15] 3,681,430
[45] Aug. 1, 1972

[54] ESTERIFICATION PROCESS FOR THE PREPARATION OF DIETHYLAMINOETHYL P-NITROBENZOATE

[72] Inventor: Carl A. Kolb, Montville, Conn.
[73] Assignee: Pfizer Inc., New York, N.Y.
[22] Filed: March 6, 1969
[21] Appl. No.: 805,021

[52] U.S. Cl.................................................260/472
[51] Int. Cl...........................................C07c 101/62
[58] Field of Search......................................260/472

[56] References Cited

UNITED STATES PATENTS 2,502,451   4/1950   Goldberg et al..............260/472
2,662,888   12/1953  Clinton et al.................260/472

Primary Examiner—Lorraine A. Weinberger
Assistant Examiner—L. Arnold Thaxton
Attorney—Connolly and Hutz

[57] ABSTRACT

A process for the preparation of diethylaminoethyl p-nitrobenzoate via the p-nitrobenzoate salt, comprising esterification with at least 1.75 molar proportions of p-nitrobenzoic acid. The ester thus produced is an intermediate for the preparation of procaine.

4 Claims, No Drawings

ESTERIFICATION PROCESS FOR THE PREPARATION OF DIETHYLAMINOETHYL P-NITROBENZOATE

BACKGROUND OF THE INVENTION

Procaine, a very useful pharmaceutical, can be produced by the reduction of the ester, diethylaminoethyl p-nitrobenzoate, to the corresponding p-aminobenzoate.

Prior art methods for preparing the intermediate ester have recognized the undesirability of using acid catalysts which form salts with the ester. Also stressed has been the use of dilute equimolar concentrations (about 0.5 molar) of alcohol and acids in inert, water-immiscible solvents to accomplish the esterification without the use of an acid catalyst.

SUMMARY OF THE INVENTION

In contrast to the prior art, the p-nitrobenzoate salt of diethylaminoethyl p-nitrobenzoate is prepared by reacting diethylaminoethanol with at least 1.75 molar proportions of p-nitrobenzoic acid in an inert, water-immiscible solvent. The concentration of the acid in the reaction mixture is preferably from 3.0 to 4.2 moles per liter of solvent. The ester is then obtained from the ester salt in high yield.

DETAILED DESCRIPTION OF THE INVENTION

According to the invention, it is critical to mix at least 1.75 molar proportions of p-nitrobenzoic acid with diethylaminoethanol in an inert, water-immiscible solvent, such as xylene, ethylbenzene, cumene, and the like. Benzene and toluene can be used but are not preferred because they give lower reaction rates than do the higher boiling solvents. This molar ratio is necessary to the formation of a substantial proportion of the ester salt. It is preferred to use a molar ratio of acid to alcohol between 1.75 and 2.75, and especially between 2 and 2.2 to obtain optimum results. Molar ratios greater than 2.75 can be used, but this does not alter the salt yield appreciably and only results in additional costs due to the use of the excess acid.

Although any acid concentration can be used, the preferred range is from 3.0 to 4.2 moles per liter of solvent for optimum results. As compared to the prior art methods which teach us to use dilute solutions for best results, it is found that the reaction is substantially complete in a far shorter time by employing such higher acid concentrations.

The water that is formed during the reaction is constantly removed from the reaction system in the form of an xylene-water azeotropic vapor. The vapor is condensed into a xylene layer and a water layer, from which the xylene is separated and returned to the reaction system. Removal of the water is necessary for the reaction to go to completion, the volume collected serving as a convenient index of the progress of the reaction. Also, recycling the xylene to the reaction mixture reduces the xylene requirements and costs. Of course, it is presumed that a proper solvent will be employed for the formation of an azeotrope with water that will not have a boiling point substantially higher than the alcohol to prevent loss due to excessive vaporization of the alcohol.

The free ester can be recovered from the reaction mixture by treatment with aqueous base, such as caustic soda, preferably with the addition of more xylene or other inert, water-immiscible solvent, to insure quantitative extraction of the free ester into the organic solvent. Alternatively, the salt can be separated from the reaction mixture by crystallization and filtration. The free ester can then be obtained in a high degree of purity from the crystalline salt by treatment with an inert, water-immiscible solvent and aqueous base.

As compared to the prior art, the use of higher concentrations of acid and alcohol results in greater production capacity at equivalent yields. The use of higher acid concentrations also results in higher reaction rates (typically 4 to 6 hours as compared to 18¾ to 24 hours by prior art methods) and no added catalyst is required. Also, the preparation of the free ester from the ester salt allows for the recovery of an ester product having a high degree of purity.

Although the preparation of the salt and ester are described as a batch-type process, this should not be interpreted as meaning the invention excludes continuous processes.

The following examples are provided for illustrative purposes and should not be interpreted as limiting the invention, the scope of which is defined by the appended claims.

EXAMPLE I

Five hundred and fifty grams of p-nitrobenzoic acid and 175 grams of diethylaminoethanol are mixed in one liter of xylene. The mixture is heated and maintained at temperatures of from 140° to 155°C. for 4 hours until esterification is substantially complete. During the esterification, byproduct water and some xylene are vaporized and continuously withdrawn into a condensing unit. The condensate separates into a water layer and a xylene layer. The xylene layer, which is separated from the water layer, is returned to the reaction mixture while esterification is continuing. After completion, the mixture is cooled to 15°C. and the p-nitrobenzoate salt of diethylaminoethyl p-nitrobenzoate crystallizes out and is recovered by filtration and washed with displacement volumes of xylene.

EXAMPLE II

The free ester is recovered by adding to the crystallized ester salt prepared by the procedure described in Example I, sufficient xylene and aqueous sodium hydroxide to the reaction mixture at a temperature of 40° to 50°C. and pH level of 9 to 10, to achieve the breakup of the ester salt and the separation of the mixture into two immiscible liquid layers - one layer consisting of a solution of 200 to 250 grams of ester (diethylaminoethyl p-nitrobenzoate) per liter of xylene, the other layer consisting of a solution of 200 to 300 grams of the sodium salt of p-nitrobenzoic acid per liter of water.

The aqueous is separated, adjusted to a pH level of 2 to 3 to precipitate free p-nitrobenzoic acid, which is then filtered and washed with water. This acid is then re-used in a succeeding esterification.

The free ester is then recovered from the xylene layer. The yield of free ester is approximately 85 percent of theory. For a reaction time of 6 hours the yield is approximately 90 to 92 percent of theory.

EXAMPLE III

Five hundred and fifty grams of p-nitrobenzoic acid and 175 grams of diethylaminoethanol are mixed in one liter of xylene. The mixture is heated and maintained at temperatures of from 140° to 155°C. for 4 hours until esterification is substantially complete. During the esterification, byproduct water and some xylene are vaporized and continuously withdrawn into a condensing unit. The condensate separates into a water layer and a xylene layer. The xylene layer, which is separated from the water layer, is returned to the reaction mixture while esterification is continuing. After completion, the mixture is cooled to 90°C. Sufficient xylene and aqueous sodium hydroxide are added to obtain a pH level of 9 to 10 and to breakup the ester salt into two immisible liquid layers - one layer consisting of a solution of 200 to 250 grams of ester (diethylaminoethyl p-nitrobenzoate) per liter of xylene, the other layer consisting of a solution of 200 to 300 grams of the sodium salt of p-nitrobenzoic acid per liter of water.

The aqueous layer is separated, adjusted to a pH level of 2 to 3 to precipitate free p-nitrobenzoic acid, which is then filtered and washed with water. The acid is then re-used in a succeeding esterification. The ester-rich xylene layer is given a simple carbon treatment and the free ester is then recovered. The yield of free ester is approximately 85 percent of theory. Mixing 438 grams of p-nitrobenzoic acid and 175 grams of diethylaminoethanol (this corresponds to a molar ratio of acid to alcohol of 1.75) results in a slightly lower ester yield.

EXAMPLE IV

The procedure described in Example I is followed, substituting ethyl benzene for xylene, and similar results are obtained.

What is claimed is:

1. A process for the preparation of the p-nitrobenzoate salt of diethylaminoethyl p-nitrobenzoate which comprises contacting diethylaminoethanol with at least 1.75 molar proportions of p-nitrobenzoic acid in an inert, water-immiscible solvent, the concentration of said acid in said solvent mixture being from about 3 to 4.2 moles per liter of solvent, maintaining the solvent mixture at reflux temperature and continuously removing byproduct water until esterification is substantially complete.

2. The process of claim 1 wherein said solvent is xylene.

3. The process of claim 1 wherein said p-nitrobenzoate salt is separated from said solvent mixture by crystallization.

4. A process for the preparation of diethylaminoethyl p-nitrobenzoate which comprises combining diethylaminoethanol with about 2–2.2 molar proportions of p-nitrobenzoic acid in xylene, at a concentration of about 3–4.2 moles of said acid per liter of xylene, maintaining the mixture at reflux temperature and removing byproduct water until esterification is substantially complete, cooling and treating said mixture with aqueous base, whereby the free ester is extracted into said xylene.

* * * * *